Sept. 25, 1923.

H. J. D'ARCY

FERTILIZER SPRAYING DEVICE

Filed June 14, 1922

1,469,065

Inventor

Harry J. D'Arcy,

By R. S. Berry

Attorney

Patented Sept. 25, 1923.

1,469,065

UNITED STATES PATENT OFFICE.

HARRY J. D'ARCY, OF LOS ANGELES, CALIFORNIA.

FERTILIZER-SPRAYING DEVICE.

Application filed June 14, 1922. Serial No. 568,331.

*To all whom it may concern:*

Be it known that I, HARRY J. D'ARCY, a citizen of the United States, residing at Los Angeles, in the county of Los Angeles and State of California, have invented new and useful Improvements in Fertilizer-Spraying Devices, of which the following is a specification.

My invention relates to spraying devices and more particularly to a spraying device wherein the fertilizer or germicide composition is disposed within the device in an unmixed condition.

An object is to provide such a device with means whereby water may be run through the device so that the water will dissolve and wash a portion of the fertilizer from the main body thereof and mix with the water and the resulting mixture may be sprayed upon the plant life where fertilizer or the like is to be placed.

Another object is to provide such a device with a water control so that the water may be shut off at the place where the device is being used and whereby the magazine may be re-loaded with a fresh cartridge without necessitating the removal of the device from a hose connected thereto or that it will be necessary for a person using such a device going to the source of water supply and shutting the water off so that the device may be re-loaded, thus effecting a considerable saving of time and also providing easy means of loading the device.

A further object is to provide a device with a removable magazine so that a composition cartridge of concentrated plant food, disinfectant or cleaner may be placed therein for spraying lawns, trees, effecting the killing of germs or removing growth or the like, and means for automatically feeding the cartridge to the water.

With the foregoing objects in view, together with such other objects and advantages as may subsequently appear, my invention resides in the parts and construction hereinafter described and claimed, and illustrated in the accompanying drawings, in which:

Figure 1:
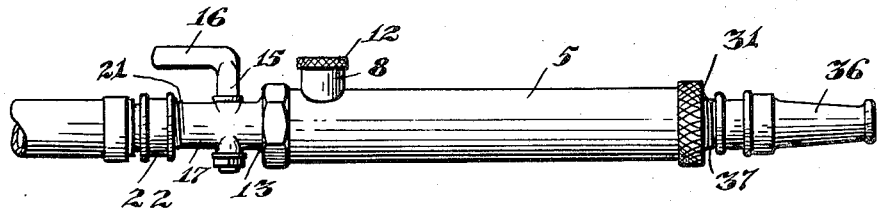
Figure 1 is a side elevation of the device connected to a hose and with a nozzle attached as in use.

More specifically, a casing 5 is provided with annular tapered threads 6 on one end and the other end is provided with an externally threaded ring 7 sweated or brazed thereto. Near one end in the side wall of the casing 5 is a stand tube 8 which has an inturned flange 9 on the upper end thereof making a seat for a gasket washer 10 on which is placed a transparent glass disk 11 held in place by a flanged threaded ring 12 threaded on to the stand tube 8 by threads on the outer end thereof so that inspection may be made of a portion of the interior of the casing 5 by looking through the glass 11 which is necessary as will be explained later in this specification.

A valve 13 having internal threads matching the threads 6 in the casing 5 is secured to the threaded end of the casing. A cage or guard wire 14 is fixed in the valve 13 and is arcuate in form and projects from the valve 13 and when in place extends into the casing 5 a short distance.

A tapered valve stem 15 having a bent handle 16 is positioned in the neck 17 and held in place by a nut 18. The valve stem has an elongated opening 19 disposed to meet the opening 20 in the valve 13. The outer end of the valve 13 is externally threaded as at 21 for the reception of a pipe coupling 22.

An elongated magazine 23 is positioned in the casing 5 having a square section, the corners of which contact with the walls of the casing to hold the magazine 23 disposed substantially longitudinally and centrally in the tube to make a clearance throughout the length of the casing to provide a passage for water. The length of the magazine 23 is somewhat shorter than the distance from the curvature of the wire 14 to the opposite end of the casing 5 leaving a clear space at this point.

A compression spring 24 is soldered in one end as at 25 to the end 26 of the magazine 23 and the other end of the spring 24 is soldered to a backing plate 27, the purpose being to exert a pressure endwise on the cartridge 28 that has been placed in the magazine 23. This pressure will hold the end 29 of the cartridge against the wire guard 14 so that when the valve is opened the water will pass around the end 29 of the cartridge projecting from the magazine 23 and also will hold the magazine 23 against a perforated disk 30 covering the outer end of the casing 5.

The disk 30 is held in place by a reduced fitting 31 screw threaded on to the threads 7 there being a gasket washer 32 interposed between the perforated disk 30 and the end wall 33 of the reducer 31.

Thus it will be seen that the water will wash against the projecting end 29 of the cartridge so that it will be dissolved and constantly mix with the water passing through the casing 5.

The perforations 34 provide outlets that will make a fine spray of the mixture and evenly and thoroughly mix the solution with the running water.

Projections 35 are formed in the central portion of the disk 30 to set the greater part of the disk away from the end 26 of the magazine 23 so that the water will have a freer passage and will be distributed over as large an area of the disk 30 as possible so as not to restrict the out-flowing water.

Figure 2:
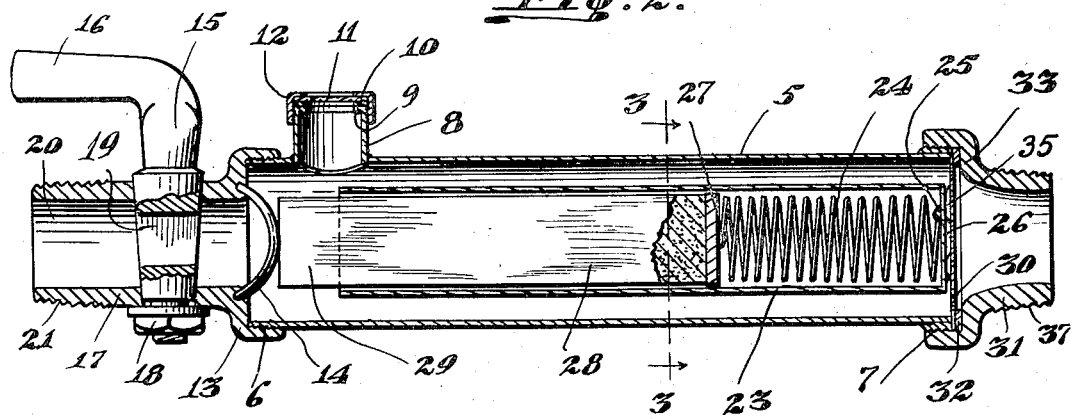
Fig. 2 is a vertical cross section on a plane with Figure 1.
Figure 3:
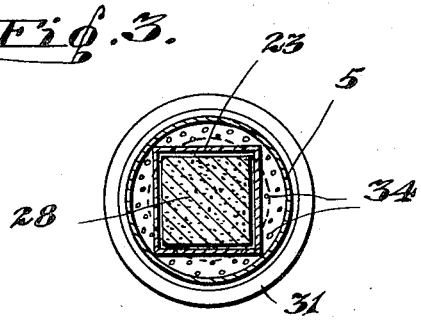
Fig. 3 is a sectional detail on the line 3—3 of Figure 2.
Figure 4:
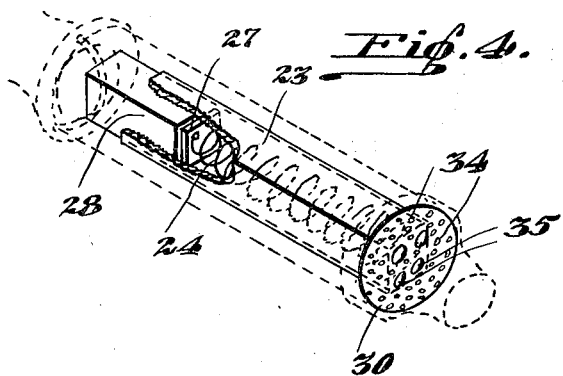
Fig. 4 is a perspective view of the magazine and distributing disk with parts broken away and adjacent parts shown in dotted lines.

Referring to Figure 2 it will be seen that the stand tube 8 in which the glass disk is held provides an accessible means for determining the wear and extent to which the soluble cartridge is washed away and will also act as an indicator so it may be determined when the cartridge is exhausted or the magazine is emptied.

In order to re-load the magazine 23 the valve 13 is closed and the reduced end 31 is removed, the magazine pulled from the casing 5 and a new cartridge inserted therein then the magazine is pushed into the casing, the reduced end replaced and the valve may be opened and the device is again made ready for the spraying operation.

As shown in Figure 1 a spring nozzle 36 is screw threaded on the external threads 37 where it is necessary to project a stream for a considerable distance.

While I have shown a specific embodiment of my invention, I do not wish to be limited to the exact details of construction shown, but may employ slight changes in the details of construction coming within the scope of the appended claims.

I claim:

1. A spraying device comprising, a casing, a magazine mounted within said casing adapted to receive a composition cartridge of soluble material, a valve fixed to one end of said casing, a reducer fixed to the other end of said casing, outlet means fixed within said reducer, means providing a clear space between said valve and said cartridge, yielding means within said magazine to feed said cartridge from said magazine to said casing, and a sight fixed in said casing adjacent the open end of said magazine.

2. In a device of the class described, a casing, a valve secured to one end of said casing, a cage fixed to the outlet opening of said valve, a magazine removably mounted within said casing, a spring in said magazine adapted when loaded to exert endwise pressure therein, a perforated disk covering the other end of said casing, a reduced fitting secured to said casing to hold the perforated disk and magazine within said casing, and a sight positioned in the wall of said casing adjacent the open end of said magazine.

3. In a spraying device, a casing, a valve fixed to one end, a guard fixed therein and extending into said casing from said valve, a magazine removably positioned within said casing, a reducer fixed to the other end, a perforated disk within said reducer covering said other end, an expansion spring fixed within said magazine having a plate fixed to one end thereof adapted to exert a pressure against the closed end of said magazine and against a cartridge when placed in said magazine to hold said magazine against said perforated disk and to hold said cartridge against said guard to space the open end of said magazine from said guard, and a sight tube having a glass disk fixed therein positioned in the wall of said casing adjacent the open end of said magazine.

HARRY J. D'ARCY.